Figure 1:
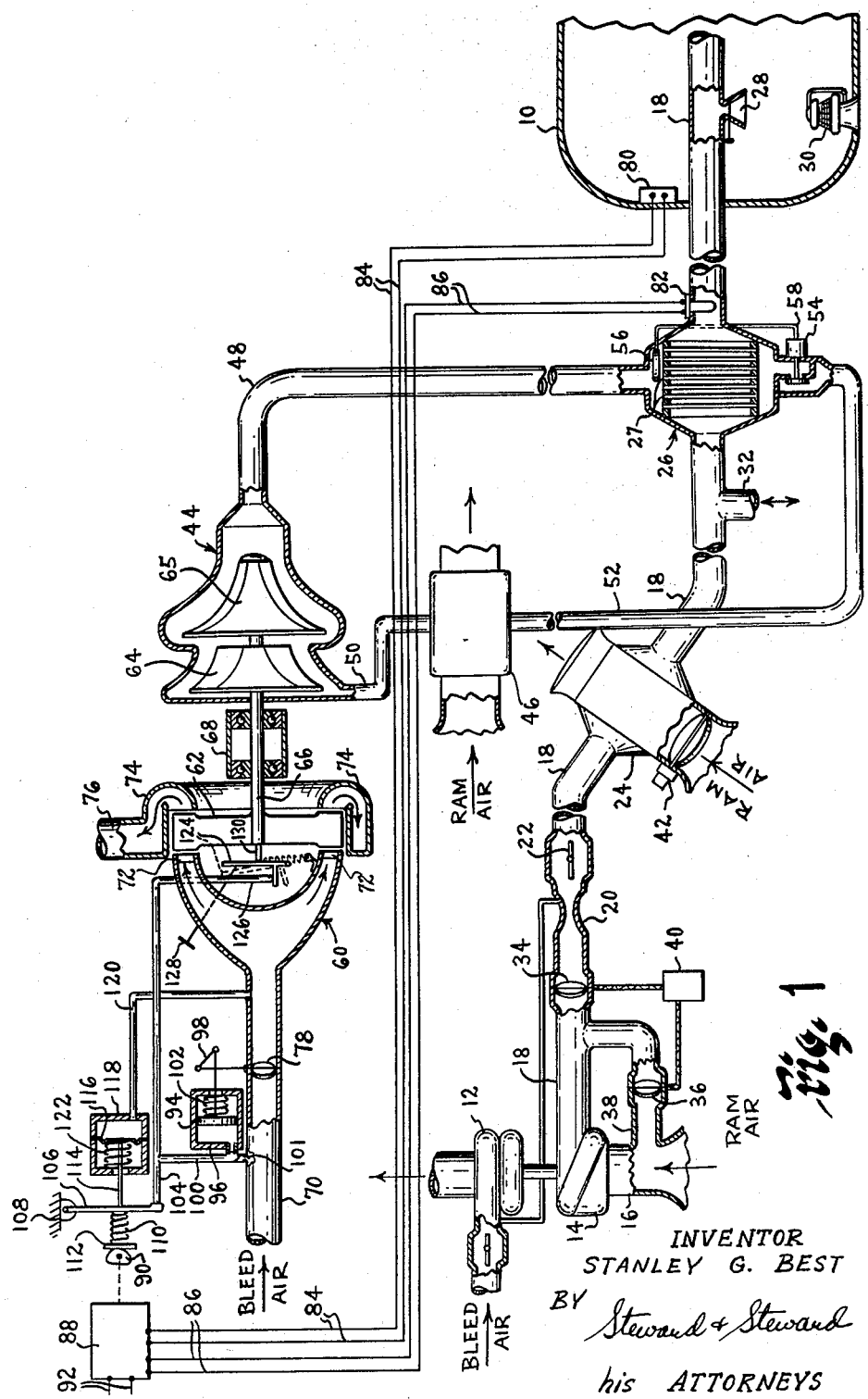

Nov. 8, 1960 S. G. BEST 2,959,029
AIR CONDITIONING SYSTEM
Filed Sept. 23, 1957 2 Sheets-Sheet 1

INVENTOR
STANLEY G. BEST
BY Steward & Steward
his ATTORNEYS

Nov. 8, 1960  S. G. BEST  2,959,029
AIR CONDITIONING SYSTEM
Filed Sept. 23, 1957  2 Sheets-Sheet 2

INVENTOR
STANLEY G. BEST
BY Steward & Steward
his ATTORNEYS

United States Patent Office 2,959,029
Patented Nov. 8, 1960

2,959,029
AIR CONDITIONING SYSTEM

Stanley G. Best, Manchester, Conn., assignor to United Aircraft Corporation, East Hartford, Conn., a corporation of Delaware Filed Sept. 23, 1957, Ser. No. 685,496

19 Claims. (Cl. 62—209)

This invention relates generally to air conditioning systems for cooling air delivered to an enclosed or confined space; and it pertains more especially to systems useful in aircraft.

For purposes of adequate passenger comfort, as well as satisfactory equipment operating conditions in many instances, modern aircraft must incorporate means for cooling the air delivered by cabin pressurization systems conventionally employed today. Both air cycle and closed vapor compression systems of cooling have been utilized for this purpose and have proved more or less effective. However, with the advent of increased air travel and more competitive conditions, air conditioning systems of greater efficiency and minimum weight are of the utmost importance.

Air cycle refrigeration systems, which cool by further compression and re-expansion of the compressed cabin air, have the inherent characteristic of reduced cooling capacity with increase in aircraft altitude, since the cooling effect is directly proportional to pressure drop in the expansion or cooling turbine and this drop decreases with altitude because the cabin pressure differential calls for a higher pressure at the turbine discharge with respect to the ambient pressure. Although the refrigerating demand may also decrease with increase in flight altitude, conditions still arise where cooling capacity is required beyond that available from an air cycle system of practical size and weight. There are also disadvantages in vapor compression systems known heretofore. In the latter type of system, wherein the cooling of the cabin air is provided by means of a heat exchanger in which a liquefied refrigerant fluid is evaporated, the cooling capacity has generally been controlled in one of several ways, as (a) by operating the system continuously at full rate and by-passing some or all of the cabin air around the heat exchanger, (b) by cyclical operation in which the system is run at a fixed, substantially maximum capacity for intermittent periods between which it is completely shut down, and (c) by restricting the flow of refrigerant in the suction or return line of the refrigerant compressor. In the first case, maximum cooling of all air passed through the heat exchanger is effected, even though this may not be needed and must accordingly be corrected by mixing with uncooled air by-passed around the exchanger. Because of the continuous maintenance of a high pressure drop in the refrigerant system, more work and less overall efficiency result. In the "on-off" cyclical operating system mentioned, undesirable fluctuations in cabin temperature occur, and at low demand severe hunting of the system arises. In the third form of system just mentioned, a lower efficiency of operation results because more power is required to run the compressor with the increased restriction in the refrigerant flow path; and at some combinations of refrigerant flow rate and compressor speed where a centrifugal compressor is employed, surge conditions harmful to the equipment as well as unsatisfactory from a temperature conditioning standpoint will result.

The present invention accordingly is designed to avoid these difficulties and to provide better cooling efficiency as well as a saving in weight, and to afford other advantages as compared to previously known systems.

The conditioning system here described utilizes a closed vapor cycle refrigerating system in which a low-boiling fluid such as Freon is used as the refrigerant medium. Aircraft in which the novel system here disclosed is designed to be used have a source of relatively high pressure air, i.e. air pressures of the order of 45 p.s.i.a., either from a compressor stage of a turbo jet engine or from an engine driven supercharger. Accordingly it is a feature of the air conditioning system of the invention to utilize such air pressure as its motive power for driving the refrigerant compressor. In the interest of minimum weight of equipment, both the compressor and the driving means therefor are of the high speed rotary type, the compressor being a centrifugal pump and the driving means therefor an air turbine, preferably of the axial flow type. Maximum capacity with minimum weight are thus achieved so that, for example, in a typical system designed for use in modern commercial aircraft, an air turbine, bleeding a maximum of around 50 air horsepower from a compressor or turbo jet compressor stage, will drive a system furnishing around 14.5 tons of refrigeration at a gross weight of slightly less than 100 pounds for all the major components of the refrigerating system including the driving turbine.

It is also a purpose of the invention to provide a more flexible air conditioning system and thereby to ensure not only a more uniform temperature condition in the cabin or other enclosure to be conditioned, but also to minimize the amount of air bled from a compressor stage of a turbo jet engine or from an engine driven compressor, as the cabin temperature conditions may permit, in order to avoid "robbing" the power plant of the aircraft of as little propulsive power as possible.

As a further object of the invention, the present system is designed to minimize also the cooling requirements of ram air in flight, thereby to reduce aerodynamic drag on the aircraft and increase its efficiency of operation.

With the foregoing objects in mind, the refrigerating capacity of the present system is varied in accordance with the requirements of cabin condition by controlling the air flow to the driving turbine and thereby the speed of the compressor. The means used to sense the refrigerating demand is desirably a modulating control device, such as a thermostat, placed either in the cabin or in the air leaving the evaporator, or both, which provides a signal utilized to actuate servo means for controlling the driving rate of the air turbine by control of the bleed air delivered thereto. Such control may take the form of means for variably positioning the vanes of the rotor of the driving turbine, or of the vanes in the nozzle thereof, or may simply be accomplished by throttling of bleed air supplied to the turbine by means of a butterfly valve in the air line. At present the latter two methods of controlling the air flow are preferred since they are mechanically somewhat simpler than arrangements for variably positioning the vanes on an impeller. Something less than the maximum possible efficiency of the rotor results from this at certain speeds, but the simplification in equipment and reduced weight tend to offset the loss of rotor efficiency at such speeds, providing a practical system of good overall efficiency.

Figure 2:
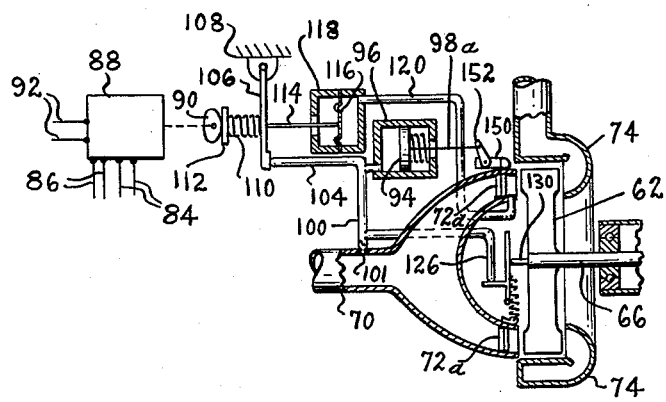
Figure 3:
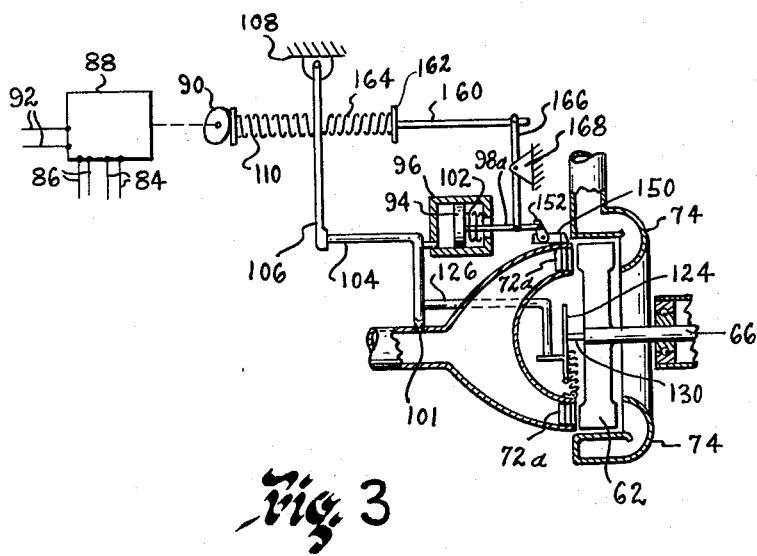

Other objects and advantages of the system will appear from the following detailed description of a typical preferred form of the invention wherein reference will be made to the accompanying drawings, wherein Fig. 1 is a schematic illustration of an air conditioning system for supplying conditioned air to an aircraft cabin or other compartment;

Fig. 2 is a fragmentary schematic view of a system similar to that shown in Fig. 1 but illustrating a modified form of turbine speed control; and Fig. 3 is another schematic view of a portion of the system illustrated in Fig. 1, showing a further modification of the turbine speed control.

Referring to Fig. 1, pressurized air is supplied to an aircraft cabin 10 by means of a supercharger system comprising an air turbine 12 driving a centrifugal compressor 14. The latter takes ram or outside air through an inlet duct 16 and delivers it under super-atmospheric pressure to the cabin air duct 18 at the outlet of the compressor. A flow control sensing device, such as the venturi 20, and a shutoff valve 22 are inserted in duct 18 between the compressor and a ram air heat exchanger 24. From this primary exchanger or intercooler the cabin air is led through a heat exchanger 26 incorporating refrigerant evaporator coils 27 where it is cooled, and thence to cabin 10 for distribution at suitable outlets, such as outlet 28. Cabin pressurization is controlled by a pressure regulator 30 of known construction which in this instance is shown as dumping directly overboard, although provision for recirculation of air from the cabin may be incorporated if desired. An interconnecting or balancing duct 32 joining cabin air duct 18 upstream of exchanger 26 serves as a return line for air recirculated from the cabin, if that system is employed, as well as providing a balancing connection in case two systems similar to the one here shown are operated in parallel. The cabin pressurization system illustrated also incorporates coordinated valves 34, 36 in duct 18 and by-pass 38, respectively, which are operated under the control of unit 40. These serve as modulating valves for control of cabin heat. Ram air admitted to intercooler 24 is under the control of a valve and actuator assembly 42. Where cooling of the cabin air is required, an initial portion of the heat of compression in the air is extracted at this intercooler, and the air is further cooled to the required degree in passing through evaporator 26.

The system described thus far is merely typical of generally well known cabin pressurization systems to which the air conditioning system of this invention may be applied, and it is to be understood therefore that the invention is not dependent upon the particular details of the pressurizing system here illustrated.

As mentioned above, final cooling of cabin air is accomplished in the passage of the air through exchanger 26. The evaporator coils 27 of this exchanger are connected in closed circuit series flow with a two-stage centrifugal compressor 44 and a condenser 46. To this end, a duct 48 connects the discharge side of coils 27 to the suction side of compressor 44; a second duct 50 leads from the compressor discharge to condenser 46; and a third duct 52 connects the condenser to the inlet side of the evaporator coils. This closed system carries a low-boiling refrigerant fluid which is compressed in compressor 44, condensed to a liquid in condenser 46 and the liquid when expanded to vapor again in evaporator coils 27, as is conventional of simple vapor-compression refrigerating cycles. A simple thermostatic type of expansion valve 54 meters liquid refrigerant to evaporator coils 27 at rates which always ensure a small amount of superheat in the refrigerant at the evaporator exit under all cooling load conditions. About +5° F. superheat is found to be optimum and this is maintained through control of expansion valve 54 by means of temperature responsive bulb 56 at the evaporator exit. This is connected to the expansion valve by a line 58, and the bulb and line are filled with an expansible fluid which is used to move valve 54 to a setting which provides the desired superheat condition at the evaporator exit. It is important to maintain a small superheat in the refrigerant leaving the evaporator to ensure that no liquid enters the compressor which, because it runs at such high r.p.m., could otherwise be severely damaged.

The means for driving the compressor comprises an axial flow air turbine 60. As shown in Fig. 1, the turbine rotor 62 is directly coupled to the compressor impellers 64, 65 by a shaft 66 supported in a suitable bearing assembly 68. Bleed air from a suitable source (e.g. a compressor stage of a turbo jet engine) is piped by conduit 70 to the nozzle plate 72 of the turbine for driving the rotor. This air passes over rotor 62 and into collector ring 74 from which it is dumped overboard through outlet 76.

Control of the rotor speed, and hence the capacity of compressor 44 and, in turn, the cooling capacity of evaporator coils 27, is effected in the system illustrated in Fig. 1 by means of a bleed air throttle valve 78 placed in conduit 70 ahead of the turbine. This flow modulating valve or throttle 78 is moved to various angular positions in accordance with signals received from temperature and pressure sensing elements by a servo device responsive to such elements. In the illustrated form of the invention, a cabin thermostat 80 and a second thermostat or other thermo-responsive unit 82 placed in air duct 18 just downstream of evaporator 26 serve as the temperature sensing means. In the arrangement illustrated, the setting or position to which throttle valve 78 is moved by the servo device is designed to be proportional to the ratio of temperature obtaining at cabin thermostat 80 to the rate of temperature change at sensing unit 82. To this end, the two temperature signals, which are electrical in the exemplary system, are transmitted by electrical leads 84, 86 to a program motor or potentiometer device 88 of known manufacture, where they are coordinated to position a cam 90. Electrical power for unit 88 and the temperature responsive units 80 and 82 is supplied through leads 92.

The servo device for actuating throttle valve 78 in the arrangement shown in Fig. 1 comprises a pneumatic actuator having a piston 94 reciprocable in a cylinder 96 and connected by suitable linkage 98 to the shaft of the throttle valve. Cylinder 96 is in communication at one side of the piston with bleed air pressure in conduit 70 at the upstream side of valve 78, the bleed air pressure being taken off from an auxiliary duct 100 which is teed into main duct 70. A suitable orifice 101 is placed in the auxiliary duct at the tee in order to effect temporary pressure changes in the auxiliary duct in accordance with variable settings of controlled bleed orifices in duct 100, as will presently be described. The opposite side of piston 94 is vented to ambient pressure. A spring 102 biases the piston against the pressure of the bleed air, this bias being such as to tend to close throttle valve 78 and shut off the flow of air to turbine 60.

Auxiliary duct 100 has a variable restriction bleed orifice 104 with which a flow restricter or flapper 106 is associated which selectively opens or closes the orifice. For purposes of diagrammatic illustration, restricter 106 is shown in the drawings as a lever pivoted at one end on a fixed trunnion 108 with the free end overlying the orifice of bleed 104. Lever 106 is normally biased to its orifice-closing position by means of a compression spring 110 confined between the lever and a follower 112. The latter is moved toward and away from the lever to increase and decrease, respectively, the biasing force in accordance with the rotated or angular setting of cam 90. A balancing force on lever 106, opposing spring 110, is provided by a diaphragm actuated push rod 114. This rod is carried by a movable diaphragm 116 in chamber 118. The enclosed side of diaphragm 116 is subjected to bleed air pressure at the downstream side of valve 78 through connecting duct 120 leading from the chamber to bleed air duct 70. The other side of diaphragm 116 is vented to atmosphere. A spring 122 confined between the vented face of the diaphragm and the end wall of chamber 118 biases push rod 114 in a direction away from lever 106, allowing the latter normally to fully close bleed 104. Thus the diaphragm and push rod function as the pressure responsive element counter-acting the effect of the temperature sensing element on the variable bleed restricter 106 for controlling the servo operated valve 78.

An overspeed control for air turbine 60 is also shown and comprises a toggle 124 which, if the turbine should overspeed, snaps over center, opening a bleed 126 in an extension of auxiliary duct 100. A manual reset control 128 is provided to return the toggle to normal after the overspeed condition is corrected.

The operation of the air conditioning system is as follows: Assuming that flow of pressurized cabin air has been established in duct 18 by compressor 14, and that such air is above the selected temperature in cabin 10 to which cabin thermostat 80 has been set, the thermostat contacts will be closed. The signal from thermostat 80 as well as that from thermo-responsive member 82 which senses the rate of change in temperature of the refrigerated air are coordinated by program motor 88 which will produce a change in angular setting of cam 90 proportional to the cooling demand. In this instance, cam 90 will be rotated in a direction which tends to increase the biasing force of spring 110 upon lever 106, thus tending to close bleed 104 more firmly. Since, under starting conditions, overspeed toggle 124 is in a position which blocks bleed 126, all escape outlets in auxiliary duct 100 of the air turbine servo control system are blocked off. Thus the full pressure of bleed air in duct 70 will be applied to piston 94 of cylinder 96.

As already mentioned, throttle valve 78 is normally urged to closed position by reason of the biasing action of spring 102 on piston 94. Pressure in duct 70 transmitted through the pressure restricting orifice 101 enters chamber 97 of cylinder 96, where it displaces piston 94 against spring 102, and in so doing opens throttle valve 78. Air then flows to nozzle plate 72 of the turbine and through rotor 62 thereof, driving the same before passing overboard through outlet 76. With the opening of valve 78, pressure is developed at the downstream side of the valve which is transmitted by duct 120 to the closed side of diaphragm 116 in chamber 118. This pressure displaces the diaphragm and its associated push rod 114 against the urging of spring 122 to cause flapper 106 to be lifted slightly away from bleed 104. Some of the pressure in auxiliary duct 100 is thus enable to escape through bleed 104, and the rate of escape is controlled by the amount of displacement of flapper 106. Valve 78 thus rapidly assumes a position in duct 70 to establish a pressure at the downstream side of the valve which is proportional to the angular setting of cam 90. Once this is established, a balance is then maintained, by correcting movements of valve 78, by the opposing actions of biasing spring 110 under the influence of cam 90 and push rod 114 under the influence of diaphragm 116 in response to the duct pressure downstream of valve 78.

Should the turbine go into an overspeed condition for any reason, toggle 124 will be snapped over center by axial movement of a governor device 130 at the center of rotor 62, thereby opening bleed 126. With this latter bleed open, the pressure in auxiliary duct 100 is so reduced as to allow piston 94 to move the throttle valve to fully closed position under the urging of spring 102. With valve 78 thus closed, driving power for turbine 60 is removed and the overspeed condition rectified. In order to set the system in condition for normal operation again, manual reset 128 must be depressed to snap toggle 124 back over center again.

Compressor 44 is therefore driven at a speed just sufficient to meet the cooling demand in the aircraft cabin. In other words, if the amount of cooling required is small, and the pressure of the bleed air in duct 70 is relatively high, valve 78 will be moved to a substantially closed position. Alternatively, if the cooling demand is high or if the bleed air pressure is relatively low (due to reduced power operation of the turbo jet engine from which the air is taken), then the valve will assume a more open position. Power changes in the turbo jet engine, and consequently in the bleed air pressure, are automatically compensated by the servo and pressure diaphragm members to maintain desired cooling as called for in the cabin.

Freon 114 is definitely preferred for use as the refrigerant fluid, not only because of its nontoxic and nonflammable properties, but because it permits the use of desirably high cycle condensing temperatures (e.g. 150° to 160° F.) without danger of dissociation. Minimum overall weight considerations consistent with reasonable compressor design dictate the foregoing high cycle condensing temperature in conjunction with an evaporator inlet temperature of about 40° F. (31° F. at the exit). This also makes the employment of a two-stage compressor of definite advantage in obtaining the objective of minimum equipment weight for maximum capacity and efficiency of the cooling system. Because of the high cycle pressure ratios (even for an easily compressed refrigerant such as Freon 114) which are required to permit the use of the aforesaid desirable levels of condenser and evaporator temperatures, a two-stage compressor permits the attainment of a relatively high overall pressure ratio at reasonable compression efficiency levels. Also, a multi-stage compressor has the further advantage of being particularly adaptable for the flash chamber cycle of operation using two expansion valves and a chamber between them instead of the one step expansion process of the simple refrigerating system specifically described. The flash chamber cycle of operation permits the use of compressors of more efficient design, but introduces some compensating weight increase due to the flash chamber and additional control equipment required, so that the overall result remains substantially unchanged.

In Fig. 2 a modified form of turbine control is shown in which the amount of bleed air allowed to pass from duct 70 through the turbine 60a is regulated by means of variably positionable nozzle vanes 72a in the nozzle plate of the turbine. The vanes are mounted for simultaneous angular displacement about their respective axes through a mechanical actuator 150. The latter is provided with a crank arm 152 pivotally connected to the piston rod 98a and is actuated by piston 94 of the pneumatic servo system previously described in connection with Fig. 1. Pressure picked off at a point downstream of vanes 72a but ahead of the turbine buckets is transmitted by conduit 120 to diaphragm 116 to provide the balancing signal for positioning flapper 106, as in the previous example.

Operation of the modified system shown in Fig. 2 is identical with that of the system already described. In this instance, however, the flow of bleed air through the turbine is controlled by the angular positioning of the nozzle vanes 72a instead of by means of the throttle valve 78 of the previous system.

The arrangement illustrated diagrammatically in Fig. 3 is similar to that of Fig. 2 except that in this case mechanical linkage, rather than pneumatic feedback, is employed to provide the balancing action for flapper 106. This linkage includes a push pull rod 160 having a foot 162, and a coil spring 164 is held in compression between this foot and flapper 106, thus counterbalancing the action of spring 110 on the opposite side of the flapper. Rod 160 is reciprocated longitudinally by an armature or lever 166 pivotally connected at one of its ends to the aforesaid rod, and at its other end to piston rod 98a of piston 94. Lever 166 is supported on a fulcrum 168 intermediate its extent and thus imparts reciprocatory movement to push rod 160 with corresponding movement of piston 94 and its associated piston rod. As here illustrated, flow of bleed air through turbine 60a is again regulated by variable positioning of nozzle vanes 72a.

In general the operation of this last system is the same as that of the other two. A signal from the cabin thermostat calling for additional cooling will cause cam 90 to be moved to a position increasing the biasing action of spring 110 on flapper 106. This tends to close orifice 104 and pressure in auxiliary duct 100 builds up, moving piston 94 to the right in the diagrammatic illustration. This opens the nozzle vanes to allow more bleed air to pass through the turbine, thereby driving it and its associated compressor at a faster rate. That movement of piston 94 also causes push rod 160 to be moved in a left hand direction in the illustration, through the action of armature 166. Thus the biasing force of spring 164 is increased, opposing the action of spring 110 and causing flapper 106 to seek a neutral position. A condition of stable equilibrium is quickly reached and maintained by balancing of the opposing forces produced by the setting of cam 90, responsive to the cooling demand, and the position of piston 94, responsive to turbine drive air pressure.

While the description given hereinabove relates to several specific embodiments of the invention, it will be understood that these embodiments are simply illustrative and that other modifications and equivalent constructions may be devised which fall within the scope of the inventive concept defined in the following claims, and are accordingly intended to be covered by the claims.

What is claimed is:

1. Temperature conditioning means for a confined space, and a supply of air delivered to said space which is cooled by said conditioning means, said means comprising a refrigerating system including a refrigerant pump, a refrigerant fluid and a heat exchanger to which said fluid is delivered by said pump and through which said air is passed, fluid drive means for said pump, and a source of variable fluid pressure for said drive means, and other means including a conditioned air temperature response element and a driving fluid pressure response element for maintaining the driving rate of said refrigerant pump, upon variation in driving fluid pressure and confined space temperature, at a level just sufficient to meet the cooling demand imposed by variation of said confined space temperature from a preselected value.

2. Temperature conditioning means for a confined space, and a supply of air delivered to said space which is cooled by said conditioning means, said means comprising a refrigerating system including a refrigerant pump, a refrigerant fluid and a heat exchanger to which said fluid is delivered by said pump and through which said air is passed, fluid drive means for said pump, and a source of variable fluid pressure for said drive means, and other means including conditioned air temperature and driving fluid pressure responsive elements for maintaining the driving rate of said refrigerant pump, upon variation in driving fluid pressure and confined space temperature, at a level just sufficient to meet the cooling demand imposed by variation of said confined space temperature from a preselected value.

3. Temperature conditioning means as defined in claim 2, wherein said fluid drive means is a high speed pneumatic turbine; a source of compressed air for driving said turbine; and means for varying the driving rate of said pump comprising flow modulating mechanism for the compressed air delivered to the turbine; servo means controlled by said temperature responsive element in accordance with temperature variation from said preselected value in said confined space, said temperature responsive element causing the positioning of said flow modulating means to vary the speed of said turbine and thereby the refrigerating capacity of said system to restore the temperature of said space to said value.

4. Temperature conditioning means for a confined space, and a supply of air delivered to said space and cooled by said conditioning means, said means comprising a closed circuit vapor cycle refrigerating system including a high speed centrifugal compressor, a refrigerant fluid and a heat exchanger incorporating refrigerant evaporator means to which said fluid is delivered by said compressor, said air passing through said exchanger for cooling thereby, means responsive to the ambient temperature of said confined space, variable rate fluid drive means connected to and driving said compressor, and other means including conditioned air temperature and driving fluid pressure responsive elements for maintaining the driving rate of said compressor, upon variation in driving fluid pressure and confined space temperature, at a level just sufficient to meet the cooling demand imposed by variation of said confined space temperature from a preselected value.

5. In a compressor and compressor drive unit for an air conditioning system, the combination of a centrifugal refrigerant compressor and a fluid motor driving said compressor, means for delivering fluid under variable pressure to said fluid motor, and other means for varying the driving speed of said fluid motor with variation in said fluid pressure and according to cooling demands upon the air conditioning system, said speed varying means including a flow modifying device controlling the driving effect in said motor of the fluid passing therethrough and mechanism for adjusting said flow modifying device in accordance with temperature conditions in a space to be air conditioned by said system and with variation in the pressure of the fluid delivered to said motor.

6. In a turbine driven refrigerant compressor unit for an air conditioning system, the combination of a centrifugal refrigerant compressor and a turbine driving said compressor, means for delivering fluid under variable pressure to the rotor of said turbine, and other means for varying the speed of said rotor with variation in said fluid pressure and according to cooling demands upon the air conditioning system, said speed varying means including a flow modulating device controlling the fluid delivered to the turbine rotor, servo mechanism responsive to fluid pressure upstream of said flow modulating device for positioning said modulating device, and a member responsive to turbine fluid pressure at the downstream side of said device and cooperating with said servo mechanism to control the setting of said flow modulating device.

7. The turbine driven compressor combination defined in claim 6 wherein said turbine is air driven and said flow modulating device comprises a variable position throttle valve.

8. The combination defined in claim 7, wherein said compressor is a two-stage radial flow compressor and said turbine is an axial flow turbine.

9. The combination as defined in claim 7, wherein said servo mechanism includes a pneumatic actuator connected to said valve to open the same and bias means urging it to closed position, and means under the joint control of conditioned air temperature and pressure at the downstream side of said valve for varying the effective pressure on said pneumatic actuator.

10. The combination defined in claim 9, wherein said pneumatic actuator is connected through a fixed orifice to said turbine at the upstream side of said valve, and said joint control means comprises a variable restriction bleed located in the pressure transmitting connection to said pneumatic actuator.

11. The turbine driven compressor combination defined in claim 6, wherein said turbine is air driven and said flow modulating device comprises variable position nozzle vanes in said turbine.

12. The combination as defined in claim 11, wherein said servo mechanism includes a pneumatic actuator for positioning said vanes, and means under the joint control of conditioned air temperature and pressure at the downstream side of said nozzle vanes for varying the effective pressure on said pneumatic actuator.

13. In an aircraft cabin supercharging system having temperature conditioning means for cooling air delivered by said system to the cabin, wherein said conditioning means comprises a closed vapor cycle refrigerating system having a refrigerant pump, a refrigerant fluid, an evaporator to which said fluid is delivered to cool the cabin air, and means responsive to cabin air temperature for controlling said system, the improvement which comprises an air turbine driving said pump, a variable position flow modulating device in the inlet of said turbine, and means for varying the position of said flow modulating device to control the driving rate of said turbine, said last means comprising a servo device actuated by turbine air pressure, and a member responsive both to cabin temperature and turbine air pressure for modifying the air pressure actuating said servo device.

14. The combination defined in claim 13, wherein said servo device comprises a pneumatic actuator having a piston actuating said flow modulating device, a duct providing pressure communication between one side of said piston and the turbine inlet pressure whereby said piston is urged by such pressure to position said flow modulating device for maximum turbine speed, a fixed orifice restriction in said duct upstream of said actuator and a variable orifice bleed port downstream thereof.

15. The combination defined in claim 14, wherein said temperature-pressure responsive member comprises a movable bleed restricter in said variable bleed port, and a variable position cam acting on said restricter to move it in one direction, means for positioning said cam in different positions according to cabin air temperature, and means opposing the action of said cam including a pressure operated member responsive to turbine air pressure.

16. The combination defined in claim 15, which further includes a first compression spring confined between said cam and restricter whereby the latter is biased by said first spring in a direction to close said bleed port.

17. The combination defined in claim 15, which further includes a first compression spring confined between said cam and restricter whereby the latter is biased by said first spring in a direction to close said bleed port, and a seconnd compression spring acting in opposition to said first spring, a member for varying the effective biasing action of said second spring, said last member being operably connected to and actuated by said actuator piston to move in a direction to increase the bias of said second spring upon movement of said piston in the direction of its maximum turbine speed condition.

18. The combination defined in claim 15, wherein said cam positioning means includes means responsive to the rate of change in cabin air temperature as it leaves said evaporator.

19. The combination defined in claim 15, wherein said cam positioning means includes means responsive to the sum of the rates of temperature change of cabin air at the exit of the evaporator.

References Cited in the file of this patent

UNITED STATES PATENTS

| | | |
|---|---|---|
| 1,093,116 | Cubelic | Apr. 14, 1914 |
| 2,219,994 | Jung | Oct. 29, 1940 |
| 2,231,069 | Harris | Feb. 11, 1941 |
| 2,242,588 | McGrath | Mar. 20, 1941 |
| 2,244,890 | McGrath | June 10, 1941 |
| 2,247,151 | Clarke | June 24, 1941 |
| 2,286,316 | Snook | June 16, 1942 |
| 2,290,426 | Haines | July 21, 1942 |
| 2,304,999 | Gonzalez | Dec. 15, 1942 |
| 2,581,329 | Newton | Jan. 1, 1952 |
| 2,752,858 | Berges | July 3, 1956 |
| 2,815,188 | Nelson | Dec. 3, 1957 |